United States Patent

Vance

[11] Patent Number: 5,319,874
[45] Date of Patent: Jun. 14, 1994

[54] ROD AND REEL CASE

[76] Inventor: Vonley D. Vance, 1423 Bellevue Dr., Mansfield, Ohio 44905

[21] Appl. No.: 859,074

[22] Filed: Mar. 27, 1992

[51] Int. Cl.⁵ .............................................. A01K 97/08
[52] U.S. Cl. ................................. 43/26; 206/315.11; 206/315.1
[58] Field of Search ............ 43/26; 206/315.11, 315.1, 206/315.2

[56] References Cited

U.S. PATENT DOCUMENTS

| | | | |
|---|---|---|---|
| 3,348,329 | 10/1967 | Seemann | 206/315.11 |
| 3,641,697 | 2/1972 | Heidtman et al. | 206/315.11 |
| 4,170,801 | 10/1979 | Ward | 43/26 |
| 4,182,391 | 1/1980 | Kjose | 206/315.1 |
| 4,196,762 | 4/1980 | Goodwin et al. | 206/315.1 |
| 4,222,193 | 9/1980 | Beck | 43/26 |
| 4,306,601 | 12/1981 | Wallis et al. | 206/315.11 |
| 4,402,355 | 9/1983 | Wymore et al. | 206/315.1 |
| 4,483,380 | 11/1984 | Beran | 206/315.1 |
| 4,546,877 | 10/1985 | Evans | 206/315.1 |
| 4,842,133 | 6/1989 | LaBarge et al. | 206/315.1 |
| 4,951,816 | 8/1990 | Smith | 206/315.1 |
| 4,951,818 | 8/1990 | Johnson | 206/315.1 |
| 4,966,279 | 10/1990 | Pearcy | 206/315.11 |
| 4,967,504 | 11/1990 | Craft | 43/26 |
| 5,052,555 | 10/1991 | Harmon | 206/315.11 |

Primary Examiner—Paula A. Bradley
Assistant Examiner—Chuck Y. Mah
Attorney, Agent, or Firm—Jerry Semer

[57] ABSTRACT

The invention is a soft sided carrying case for fishing poles. The case has a handle made out of polypropolene webbing and a zipper for opening and closing. The case on the inside has straps or tie downs for holding the fishing poles in place. These straps or tie downs are fasten permanently on one end and on the other end have a releasably fastener such as velcro, buttons or snaps. The fishing poles are placed in the case and the tie downs are ran over 7 the fishing poles and are fasten down by the releasable fastener. In the preferred embodiment the inter and outer covering of the case is nylon. Foam is placed between the inter and outer covering of the case. To provide stiffness to a case a masonite board is also added to the foam and stuffing between the inter and outer covering on the top and bottom of the case.

8 Claims, 2 Drawing Sheets

ROD AND REEL CASE

FIELD OF THE INVENTION

This invention relates to a rod and reel case and more particularity to a soft sided rod and reel case.

BACKGROUND OF THE INVENTION

Fishermen have found that it is very difficult to carry rods and reels to the fishing site. Usually the lines get all tangle. Therefore, an objective of this invention is to design a fishing rod carrying case that eliminate the problems of tangle lines. A further objective of this invention is to ensure that the rods and reels will stay clean both when being carried to the fishing site and in storage. The inventor has design his case so that it will float and thus, if rod and reel in the case drops into water, it will float to the top and be easily retrieve. Also a case of this type must be light in weight, inexpensive to manufacture, look good and be easy to use. Therefore, it is an objective of this invention to make a light weight inexpensive carrying case that looks like luggages that is easy to use for carrying rods and reels.

One case for a fishing rod case is found in the U.S. Patent to Beck, U.S. Pat. No. 4,222,193 granted Sep. 16, 1998. This patent is a tubular sleeve made out of braided plastic filaments that covers a fishing rod. Beck's Patent unlike the applicant does not cover both the rod and reel. One of the objective of the applicant patent is to design a fishing rod carrying case that carries both the rod and reel so that an individual fisherman does not have to take the reel from the rod every time he stores it. Also this case carries the rod at full length and not broken down. Most rods break down into two or more pieces. Since most rods are five to six feet long a case that carries a non broken down rod is very awkward to carry. Thus, one of the objective of the invention is to make a carrying case that is not awkward to carry. Further, this carrying case does not look like a piece of luggage. One of the objective of the inventor was to design a carrying case for a rod and reel that looked like a piece of luggage. Lastly since this is just a covering over the rod the rod could easily be damages if the individual struck the rod case with the rod inside on an object while carrying it. This is especially true as to Beck's Patent since Beck carries the full length rod which would be awkward to carry and thus, could easily be struck against objects when being carried. To overcome this problem U.S. Patent to Evans U.S. Pat. No. 4,546,877 granted October 1985 has a tube portion to fit over the rod portion up to where the reel is attached. Then in Evans a small bag like structure fits over the reel. However, by using a solid tube like portion for the carrying case one eliminates the advantages of the soft sided carrying case. These advantages being that soft sided carrying cases do not age as quickly as hard sided cases and do not scuff as easy. Further, a soft sided case can be washed in a washer to clean it where as a hard case can not. Further, a soft sided case is usually lighter in weight then the hard sided cases. One of the objective of this invention is to create a soft sided case that has sufficient strength that the rods and reel carry in side will not be damage if the case is bumped or dropped. The Evans's Patent also has similar disadvantages as to the Beck's Patent in that it carries the rod in a non broken down position which makes it very awkward to carry and secondly it clearly does not look like a piece of luggage. Also, since it carries the rod in a non broken down position the case must be made of a length that is sufficient enough to handle the longest rods on the market which will thus make the case even more awkward for carrying most rods.

A further objective of the invention is to make a fabric covered case that is water proof and not subject to mold, mildew or rot.

SUMMARY OF THE INVENTION

The invention is a soft sided carrying case for fishing poles. The case has a handle made out of polypropolene webbing and a zipper for opening and closing. The case on the inside has straps or tie downs for holding the fishing poles in place. These straps or tie downs are fasten permanently on one end and on the other end have a releasably fastener such as velcro, buttons or snaps. The fishing poles are placed in the case and the tie downs are ran over the fishing poles and are fasten down by the releasable fastener.

In the preferred embodiment the inter and outer covering of the case is nylon. Foam is placed between the inter and outer covering of the case. To provide stiffness to a case a masonite board is also added to the foam and stuffing between the inter and outer covering on the top and bottom of the case.

DETAILED DESCRIPTION OF THE PREFERRED EMBODIMENT

In the preferred embodiment the invention is a case 10 with a handle 12. The case is approximately four feet long and eight inches wide. This style of case is design for two broken down fishing rods. The average fishing rods will break down into a section less than four feet long. The case of the size stated above would handle two fishing rods. However, the case 10 could made larger to handle more fishing rods or the case 10 could be made longer to handle a fishing rod that would not break down.

Figure 1:
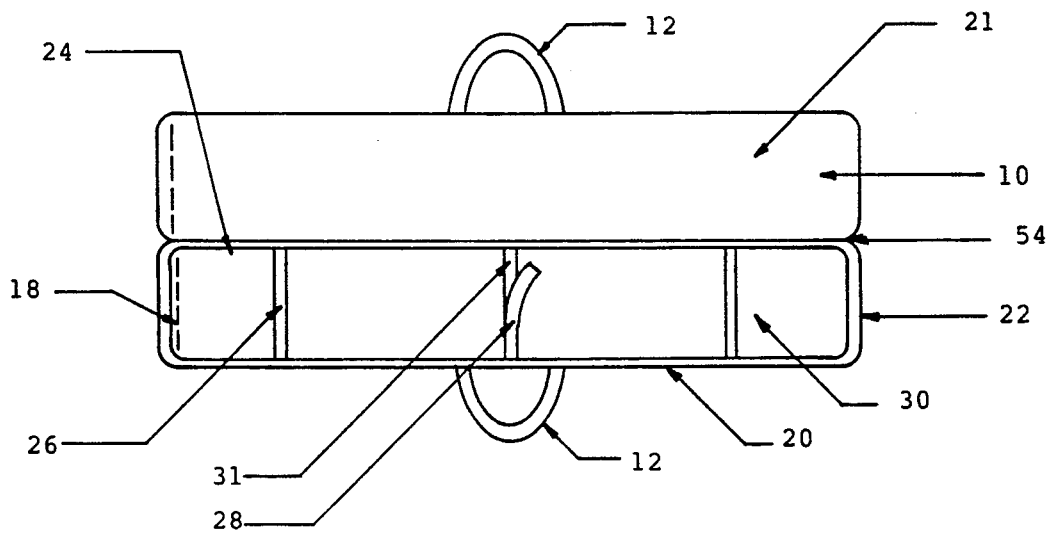
FIG. 1 shows a top view of the case with the case open.
Figure 2:
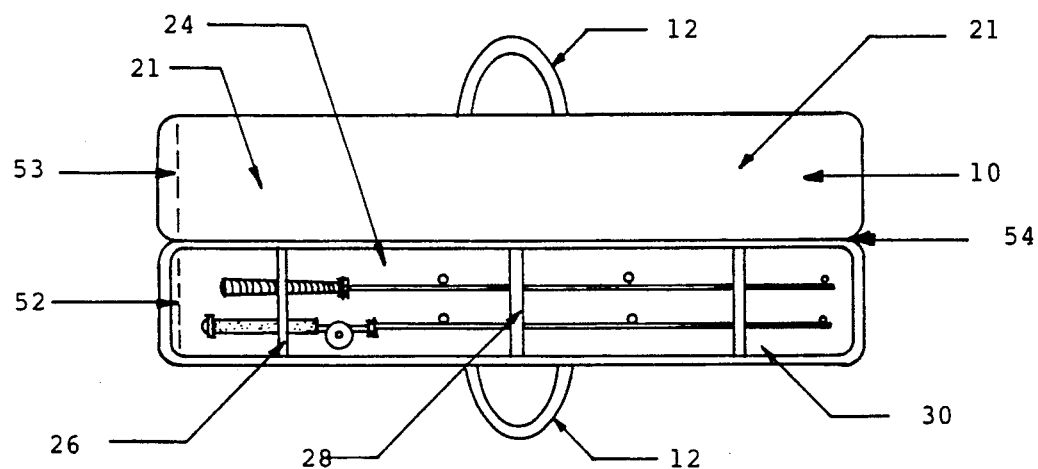
FIG. 2 shows a top view of the case with the case open and fishing poles placed inside.
Figure 5:
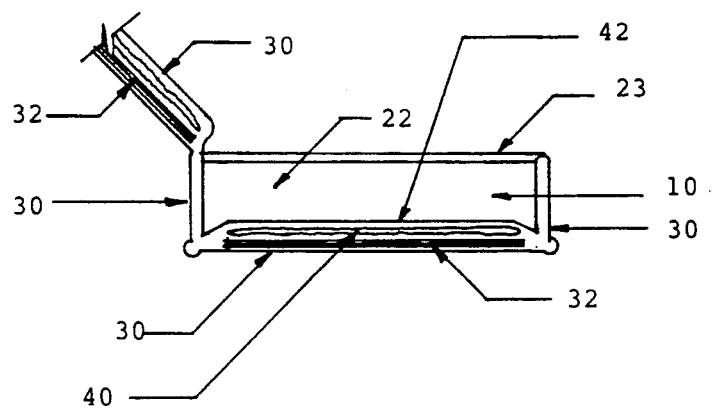
FIG. 5 is a cut away side view of the invention.
Figure 6:
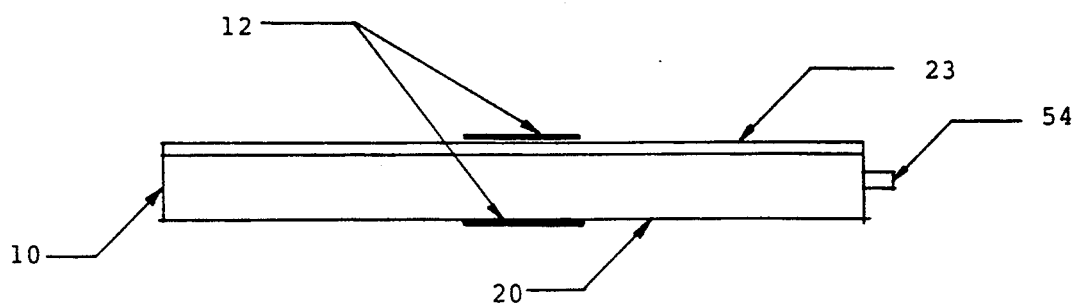
FIG. 6 is a front view of the invention.

FIG. 1 shows a top view of the case 10 with the case 10 being open. The case 10 has a bottom 16 and sides 18, 20, 22 and 24. The case has a lid that is attached to side 24. Around the outside side of the lid and the top of sides 18, 20 and 22 is a zipper 23 for closing the case as shown in FIGS. 5 and 6. Within the case there are three tie downs 26, 28 and 30 to hold the polypropolene and reel in place. These tie downs 26, 28, and 30 are nylon webbing. However, any type of material could be used for the tie downs 26, 28 and 30. The tie downs 26, 28 and 30 are permanently held at one end and at the other in the preferred embodiment by velcro. The tie downs 26, 28 and 30 could be held down by other methods such as snaps or tie, or buttons. In use the rod is placed in the case and the tie downs 26, 28 and 30 pass over the rod and are fastened down on the other side of the rod as shown in FIG. 2.

Figure 3:
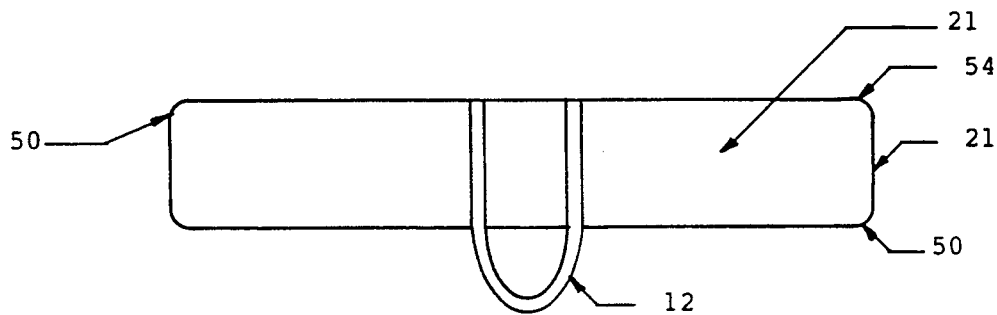
FIG. 3 shows a top view of the invention with the case closed.
Figure 4:
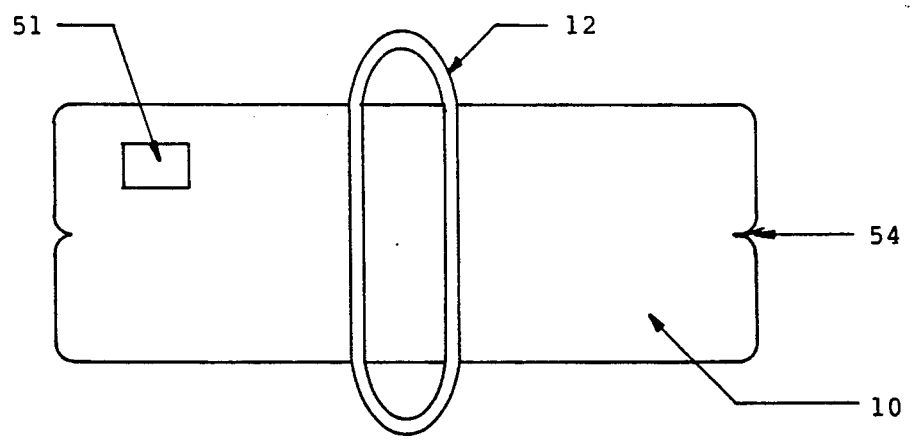
FIG. 4 is a bottom view of the invention with the case open.

FIG. 3 shows the top view of the invention. In FIG. 3 one can see that the corner 50 of the invention have a curved radius. This radius is design for longer ware since a square corner would cause more pressure in opening and closing the device on the corners. FIG. 2 also shows the handle 12 is u-shaped and extends from the center of the top and bottom of the invention. The handle 12 is also made out of poloypropolene webbing however, it can be made out of any material that is sufficiently strong for use as handles. The handle 12 is made stronger by wrapping the webbing fully around the carrying case. As one can see from FIG. 4 a view of the case which is open from the cases back, the handle 12 actually forms an oval on the open case 10. The handle 12 is wrapped fully around the case for additional strength.

FIG. 5 is a cut away side view of the case which shows the inter structure of the case 10. The outer and inter surface of the case 10 in the preferred embodiment is made out of nylon. However, any type of cloth material which has sufficient strength and can be made water repellant can be used. However, nylon is idea for this situation due to it great strength and the fact that it can be made water repellant and not subject to not mold or mildew. In the preferred embodiment the nylon has been treated to be water repellant. In the preferred embodiment the outer covering is nylon backed with foam which makes the case wear better and look nicer. The inter stuffing, shown in FIG. 5, of the bottom of the case is basically a foam 30 placed between the nylon outer 40 and inter 42 surface. In the preferred embodiment the foam 30 is place on top of a board 32 which is enclosed by nylon. The top is basically design similar where the board 32 is set upon a piece of foam 30 and enclosed with nylon. The board 32 is used to give the case additional strength. The nylon sides of the case are foam filled. The case is designed so that if it is dropped in water it will float. The foam in the preferred embodiment in the case is urethane foam. The boards and the foam can be removed through slits 52 and 53 so that the case could be washed. The use of foam and boards makes the case extremely light and flexible.

FIG. 6 shows a nylon loop that is attached to side 24. The loop 54 allows the invention to be hung in storage. Pockets can be added to the case by just sewing a piece of fabric to either the outer or inter surfaces of the case. FIG. 3 shows pocket 51 on the outside of the case.

Changes in modification in the specifically described embodiment can be carried out without departing from the scope of the invention which is intended to be limited to only by the scope of the appended claims.

I claim:

1. A fishing rod and reel carrying case comprising:
   a. a container adapter to hold a fishing rod and reel and said container has a lid, bottom, and four sides and said lid, bottom and sides have an inner and outer surface which is made of cloth and said lid is rotatably attached to one side, whereby said lid can be lifted to open said container; and,
   b. means for fastening the lid in a closed position; and,
   c. a handle attached to the outer surface of the container so that the container can be carried or lifted; and,
   d. tiedowns that are permanently attached on one end to the inner surface of the container and releasably attached on the other end to the container and are adapted such that when the fishing pole is placed within the container the tiedowns can pass over the fishing pole and hold the fishing pole in place; and,
   e. a buoyant filling placed between the inner and outer surface, and
   f. the case when holding a fishing rod and reel has a specific gravity of less than unity.

2. A case as in claim 1 wherein:
the cloth for making the inner and outer surface of the case is nylon.

3. A case as in claim 1 wherein:
a means for stiffening and protecting said fishing rod is placed between the inner and outer surface of the lid and the inner and outer surface of the bottom of the container and said means does not affect the floatability of said container.

4. A case as in claim 1 wherein:
the means for stiffening can be completely removed.

5. A case as in claim 1 wherein:
the means for fastening the lid in a closed position is a zipper.

6. A case as in claim 1 wherein:
   a. the container is adapted to hold two broken down fishing rod and reels;
   b. the case when holding two fishing rods and reels has a specific gravity of less than unity.

7. A case as in claim 1 further comprising:
a pocket on the outer surface of the case.

8. A case as in claim 1 wherein:
the buoyant filling is foam.

* * * * *